United States Patent [19]
Ozzie et al.

[11] Patent Number: 5,664,099
[45] Date of Patent: Sep. 2, 1997

[54] METHOD AND APPARATUS FOR ESTABLISHING A PROTECTED CHANNEL BETWEEN A USER AND A COMPUTER SYSTEM

[75] Inventors: Raymond E. Ozzie, Manchester by the Sea; Eric M. Patey, Rockport; Charles W. Kaufman, Northboro, all of Mass.; Steven R. Beckhardt, Nashua, N.H.

[73] Assignee: Lotus Development Corporation, Cambridge, Mass.

[21] Appl. No.: 579,744

[22] Filed: Dec. 28, 1995

[51] Int. Cl.⁶ .................................................. H04L 9/32
[52] U.S. Cl. ..................... 395/186; 380/4; 380/23; 380/25; 395/187.01; 395/188.01
[58] Field of Search .................... 395/186, 187.01, 395/188.01, 340; 380/23, 25, 4, 30; 340/825.31

[56] References Cited

U.S. PATENT DOCUMENTS

| | | | |
|---|---|---|---|
| 5,323,146 | 6/1994 | Glaschick | 340/825.34 |
| 5,347,579 | 9/1994 | Blandford | 380/25 |
| 5,428,349 | 6/1995 | Baker | 380/23 |
| 5,434,918 | 7/1995 | Kung et al. | 380/25 |
| 5,483,598 | 1/1996 | Kaufman et al. | 380/43 |
| 5,491,752 | 2/1996 | Kaufman et al. | 380/30 |

*Primary Examiner*—Robert W. Beausoliel, Jr.
*Assistant Examiner*—Ly V. Hua
*Attorney, Agent, or Firm*—Bookstein & Kudirka, P.C.

[57] ABSTRACT

In order to establish a protected channel between a user and a software program running on a computer system, a graphic display unique to the user is displayed along with the normal information entry graphics. A foreign program which might duplicate the overall appearance of the entry graphics cannot display the unique visual display which would appear on the legitimate entry screen of a particular user. Thus, a user looking at his entry screen can tell by the visual display whether the entry screen has been generated by a legitimate program or by a foreign impostor program. Further, since it might be possible for an unauthorized person to surreptitiously observe the unique display pattern on the entry screen of an authorized user, to increase security, a program constructed according to the principles of the invention, changes the visual display as information is entered based on the partially entered information. Thus, even if an unauthorized person should oversee the entry of the information by an authorized user, memorize the display and incorporate the display in an impostor program, the impostor program would be unable to duplicate the sequence of visual displays which occurs during the entry of the information because the information itself is unknown.

21 Claims, 7 Drawing Sheets

METHOD AND APPARATUS FOR ESTABLISHING A PROTECTED CHANNEL BETWEEN A USER AND A COMPUTER SYSTEM

FIELD OF THE INVENTION

This invention relates to computer security systems and, in particular, to systems in which a protected channel is established between a user and authorized software running in a computer system.

BACKGROUND OF THE INVENTION

Many computer systems utilize some type of security to prevent unauthorized use. In the vast majority of systems, this security takes the form of a single password per user for a particular company. This password is conventionally an arbitrary combination of characters known only to the user.

Security is a major concern in computer networks because once an unauthorized person gains access to the network a large number of files and information can then be accessed by the unauthorized person and compromised. With the advent of the INTERNET, computer security has taken on additional urgency. Using the INTERNET, and a valid password, unauthorized persons can gain access to computer networks and improperly view and retrieve confidential files. It is often very difficult to trace the location of the unauthorized user over the INTERNET connections.

With the software sophistication increasing it is sometimes difficult for an authorized user to be sure that he is actually communicating with a legitimate program on his own system. For example, it is possible for an unauthorized person to send an authorized user an "active" or "Trojan horse" mail message over an INTERNET connection. This mail message is programmed to generate a visual display which is the same as a display generated by the legitimate program which appears when a user must enter information, such as his password. When the user enters the requested information into such a mail message, the entered characters are captured and returned to the person who sent the mail message, thereby compromising the information or password, possibly without the user's knowledge. Still other software merely records information passing between the user and the legitimate program and forwards this information back to the unauthorized "eavesdropper."

Thus, it has been necessary to establish what is termed a "protected channel" between a user and legitimate software. Such a protected channel provides a means for a legitimate program to interface with a user in a manner in which other software cannot detect or record the information which passes between the user and the legitimate program. There have been a number of prior art methods for providing such a protected channel to prevent information and valid passwords from being stolen. One known method is embodied in the WINDOWS NT® operating system sold by the Microsoft Corporation, Redmond, Wash. The WINDOWS NT® operating system provides a protected channel by requiring the user to enter a particular key sequence during information (password) entry. The key sequence is CONTROL-ALT-DELETE. When the operating system receives this sequence, it prompts the user for a password, however, this key sequence terminates any application programs which are in operation during the password entry sequence. Thus, any "Trojan horse" or eavesdropping programs will be terminated during the information entry sequence. After the information has been entered correctly, the operating system returns control to the application programs. Thus, during the entry sequence, the user can be sure that no "foreign" programs are active.

The aforementioned scheme works well but is not available to application programs. Since each application program must interface with the operating system like any other application program, the application program itself cannot be programmed to recognize the CONTROL-ALT-DELETE sequence because it would be terminated by the sequence.

Therefore, there is a need for an apparatus and a method for providing a protected channel between a user and legitimate software which can be used by application programs.

SUMMARY OF THE INVENTION

The foregoing problems are overcome and the foregoing need is met by one illustrative embodiment of the invention in which a graphic display unique to the user is displayed along with the normal information entry graphics. A foreign program which might duplicate the overall appearance of the entry graphics cannot display the unique visual display which would appear on the legitimate entry screen of a particular user. Thus, a user looking at his entry screen can tell by the visual display whether the entry screen has been generated by a legitimate program or by a foreign impostor program.

Further, since it might be possible for an unauthorized person to surreptitiously observe the unique display pattern on the entry screen of an authorized user, to increase security, a program constructed according to the principles of the invention, changes the visual display as information is being entered based on the partially entered information. Thus, even if an unauthorized person should oversee the entry of the information by an authorized user, memorize the display and incorporate the display in an impostor program, the impostor program would be unable to duplicate the sequence of visual displays which occurs during the entry of the information because the information itself is unknown. This latter technique is particularly useful for secret information, such as passwords.

Additional techniques are incorporated into one illustrative embodiment to prevent unauthorized persons from examining the display screen as an authorized user types each character in the information and thereby incrementally obtaining the information.

BRIEF DESCRIPTION OF THE DRAWINGS

FIGS. 2B and 2C illustrate typical graphical display changes which occur during the entry of a password.

DETAILED DESCRIPTION OF THE PREFERRED EMBODIMENT

Figure 1:
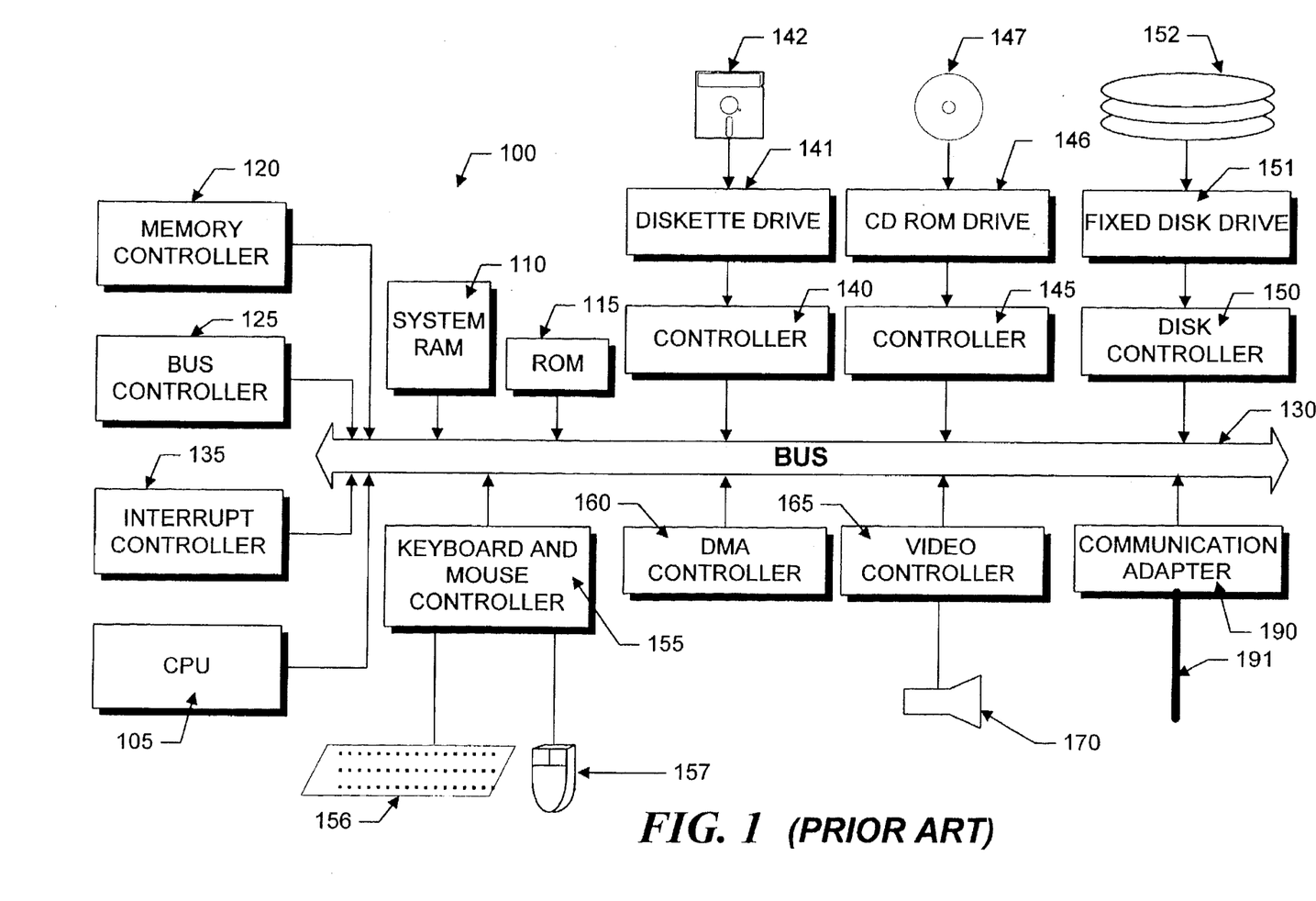
FIG. 1 is a block diagram of a personal computer system suitable for use with the present invention.

FIG. 1 illustrates the system architecture for a conventional computer system, such as an IBM PS/2® computer on which the inventive security system can operate. The exemplary computer system of FIG. 1 is for descriptive purposes only. Though the description below may refer to terms commonly used in describing particular computer systems, such as an IBM PS/2 computer, the description and concepts equally apply to other systems, including systems having architectures dissimilar to FIG. 1.

The exemplary computer 100 includes a central processing unit ("CPU") 105, which may include a conventional microprocessor; a system random access memory ("RAM") 110 for temporary storage of information and a read only memory ("ROM") 115 for permanent storage of information. A memory controller 120 is provided for controlling system RAM 110; a bus controller 125 is provided for controlling bus 130; and an interrupt controller 135 is used for receiving and processing various interrupt signals.

Mass storage may be provided by a diskette 142, a CD-ROM disk 147 or a hard disk 152. The diskette 142 can be inserted into a diskette drive 141, which is, in turn, connected to bus 130 by a controller 140. Similarly, the CD-ROM disk 147 can be inserted into a CD-ROM drive 146, which is also connected by a controller 145 to bus 130. Finally, hard disks 152 are part of a fixed disk drive 151, which is connected to bus 130 by controller 150.

Input and output to computer system 100 are provided by a number of devices. For example, a keyboard and mouse controller 155 connects to bus 130 for controlling a keyboard input device 156 and a mouse input device 157. A DMA controller 160 is provided for performing direct memory access to system RAM 110. A visual display is generated by a video controller 165, which controls a video output display 170. The computer also includes a communications adapter 190 which allows the system to be interconnected to a local area network (LAN) or a wide area network (WAN) which is schematically illustrated by bus 191.

The computer 100 is generally controlled and coordinated by operating system software, such as the OS/2® operating system, available from the International Business Machines Corporation ("IBM"), Boca Raton, Fla. Conventional operating systems control and schedule computer processes for execution, perform memory management, provide file system, networking, and I/O services, and provide a user interface, such as a graphical user interface ("GUI"), among other things. User applications, such as editors and spread sheets, directly or indirectly, rely on these and other capabilities of the operating system.

Figure 2A:
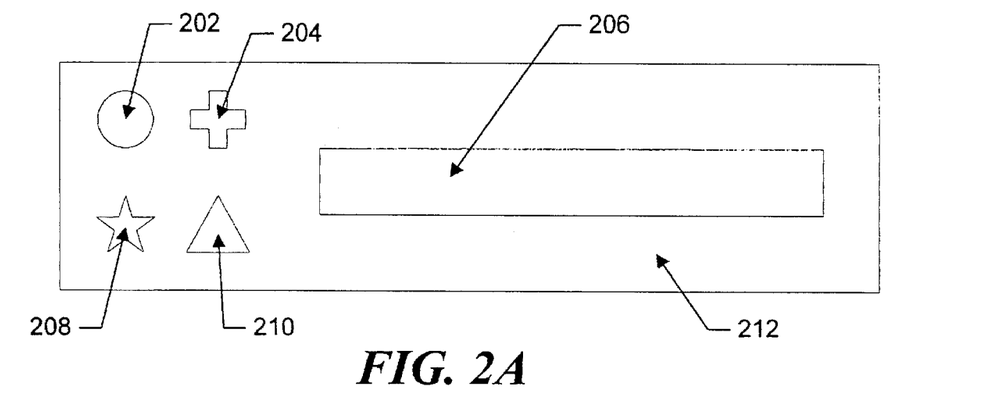
FIGS. 2A-2C are schematic illustrations of a portion of a password entry screen display which incorporates the inventive unique graphical display of the present invention.
Figure 2B:
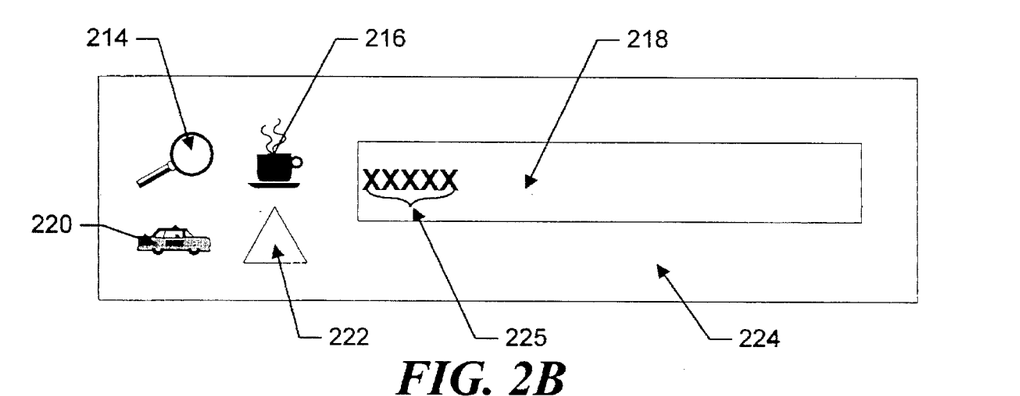
Figure 2C:
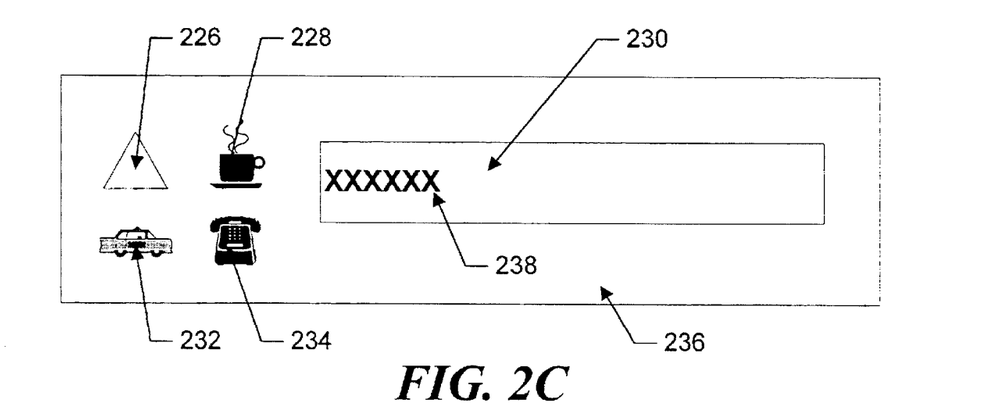

FIGS. 2A–2C depict illustrative screen displays generated by a preferred embodiment of the present invention. For example, as shown in FIG. 2A, the screen display 212 might be generated by a legitimate program in order to prompt for the entry of information such as a password. Although the following description relates especially to entry of password information, it is understood that the inventive arrangement can also be used to establish a protected channel during the entry of other information. Screen display 212 contains a password entry area 206 in which the password characters (for example, which might be entered on a keyboard) are echoed or displayed by the program. In addition, to the left of the password entry area 206 is a graphic display area generated in accordance with the principles of the present invention. This graphic display area displays a unique graphical pattern for each authorized user. This pattern, for example, might be generated from a unique login ID which is received by the computer system when the user initially logs onto the computer.

In one illustrative embodiment, the graphical pattern consists of a pattern of separate icons which are chosen from a larger "pool" of icons. The number of, and the actual icons in the pool are predetermined. For example, as shown in FIG. 2A, four icons 202, 204, 208 and 210 are shown which might be drawn from a fixed pool of sixteen possible icons. Alternatively, the unique graphic display can be generated from unique user information. Since the pattern of icons or the graphic display is unique to each authorized user, an impostor program which generates the general overall screen display 212 including the password entry area 206, without more, could not generate the unique pattern for a particular user.

However, it is possible that unauthorized person could "look over the shoulder" of an authorized user and memorize the user's password pattern and then subsequently create an impostor program which also generated the pattern. In order to avoid the possibility of such counterfeiting, in accordance with the principles of the present invention, the password entry program is arranged to change the displayed pattern based on the entered portion of the password. For example, as shown in FIG. 2B, the pattern of icons 214, 216, 220 and 222 changes after several characters 225 have been entered. Likewise, FIG. 2C shows a change in the icon pattern caused by the entry of an additional character 238. Since the icon pattern changes are based on each entered character of the password, it is virtually impossible for an impostor program to duplicate the pattern of icons generated during password entry without knowing the password. Furthermore, the final graphic display will depend on the actual password entered and therefore cannot be duplicated by an impostor program without knowledge of the password.

Generally, the graphic display changes rapidly as the user types the password. However, it might still be possible for a person observing the screen during password entry to memorize the graphical display pattern sequence. Later, the person could enter different characters until by trial and error the identical display was produced. In this manner, a person could incrementally learn the password character by character. In order to obviate this problem, the present invention utilizes several additional changes to the basic entry pattern. In particular, no changes are made to the unique graphic display initially displayed until a minimum number, for example four, characters have been entered. Further, the displayed graphic pattern is based not on the actual password characters, but on a cryptographic hash of the entered characters.

It is also possible to significantly complicate the trial and error approach by utilizing some non-unique function of the password characters to generate the graphic display. For example, a preferred method to generate the graphical display is to select icons from a pool of icons by parsing the entered character string, or some information derived from the entered character string, into bit groups and then using these bit groups to select the icons. For example, if a pool of sixteen icons is used then the password string, or a derivative, is parsed into four-bit groups and each group is then used to select an icon. However, in order to make the password entry scheme more complex and therefore more difficult to determine by trial and error decoding, each icon might for example be selected by generating the parity of each entered character, generating a derivative based on the parities and then parsing the derivative. With this modification, several different parsed groups would select the same icon, thus making the trial and error approach much more difficult.

Figure 3:
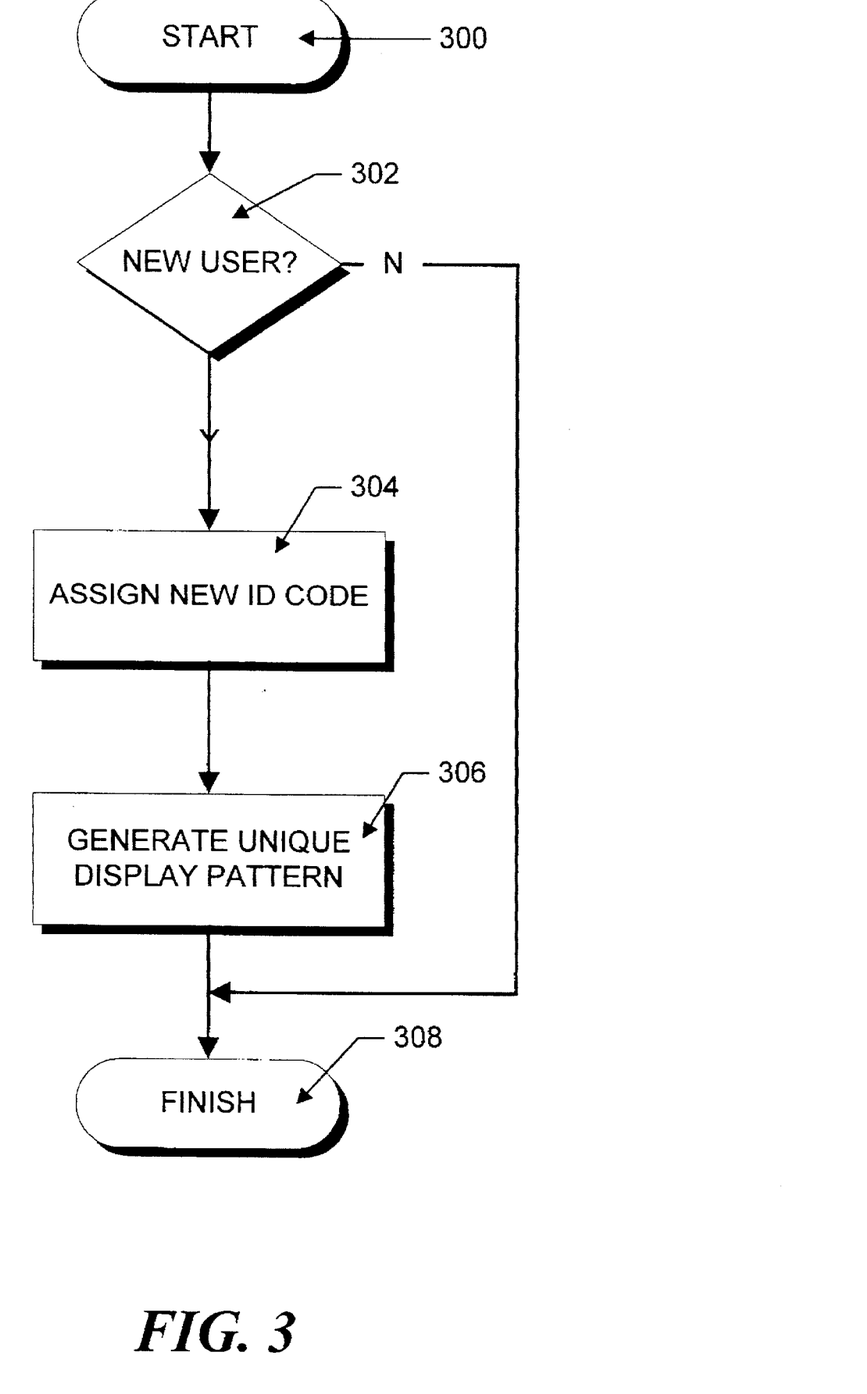
FIG. 3 is an illustrative flowchart of the steps involved in establishing a unique ID code for a new user.

FIG. 3 is an illustrative flowchart which describes the steps in a routine used to assign a new ID code to a new user. The rectangular elements (typified by element 304), herein denoted "processing blocks," represent computer software instructions or groups of instructions. The diamond-shaped elements (typified by element 302), herein denoted "decision blocks," represent computer software instructions or groups of instructions which effect the execution of the computer software instructions represented by the processing blocks. The flow diagram does not depict syntax of any particular computer programming language. Rather, the flow diagram illustrates the functional information which one of ordinary skill in the art would require to generate computer software to perform the processing required to decrypt an encrypted file structure. It should be noted that many routine program elements, such as initialization of loops and variables and the use of temporary variables, are not shown.

The routine begins in step 300 and proceeds to step 302 where a check is made to determine whether a user accessing the system is a new user. This determination might be made, for example, by examining the login code the user uses to log onto the system. If, in step 302, a determination is made that the user is not a new user then the routine ends in step 308.

Alternatively, if in step 302, a determination is made that the user is new, an ID code is assigned in step 304. This ID code may be the login code itself, a unique random number or some other code which is assigned by the computer system from a pool of codes. The code must be selected such that it produces a unique graphical pattern on the password entry screen for each user in the system.

Once the ID code has been assigned, the routine proceeds to step 306 in which a unique display pattern is generated from the new ID code. The steps involved in generating the display pattern are described in detail in FIG. 4. The routine then finishes in step 308.

Figure 4:
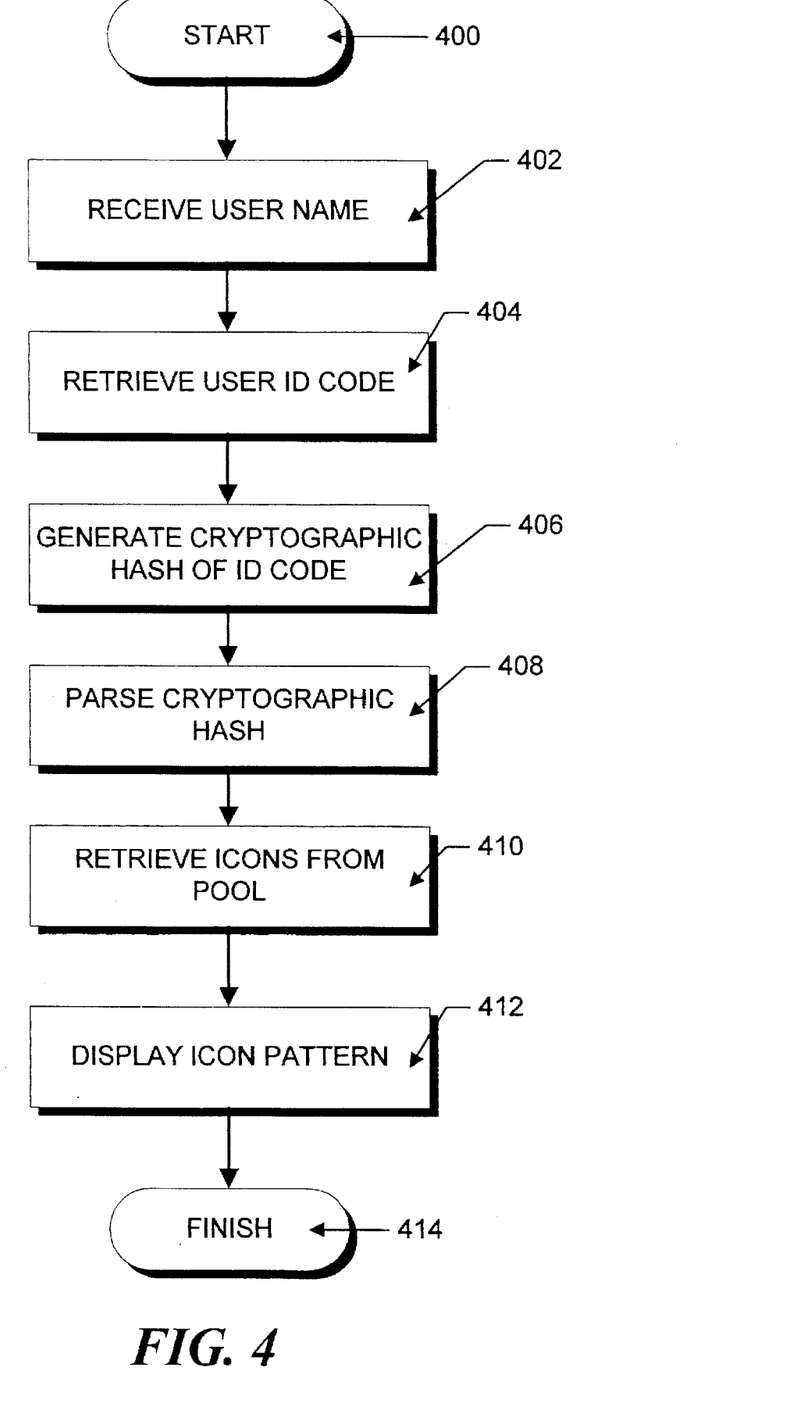
FIG. 4 is an illustrative flowchart for a routine which generates a graphical display when the password entry screen graphics are initially displayed.

FIG. 4 is an illustrative flowchart illustrating the steps used to generate a unique display pattern from an ID code. In particular, the routine begins in step 400 and proceeds to step 402 where a user name is received by the system. In step 404 the ID code for generating the unique pattern is retrieved from a secure location. Next, in step 406, the retrieved ID code is used to generate a cryptographic "hash." This hash is used to generate the graphic pattern so that a person observing a particular pattern could not then discover the ID code. In an illustrative embodiment, the ID code is hashed using, a one-way cryptographic "hash" of the actual ID code combined with other values. These other values can be predetermined and embedded into the password entry software, separately entered by the user or a combination of both. In particular, the ID code can be simply concatenated with these other values or combined in another manner and then hashed.

Figure 5:
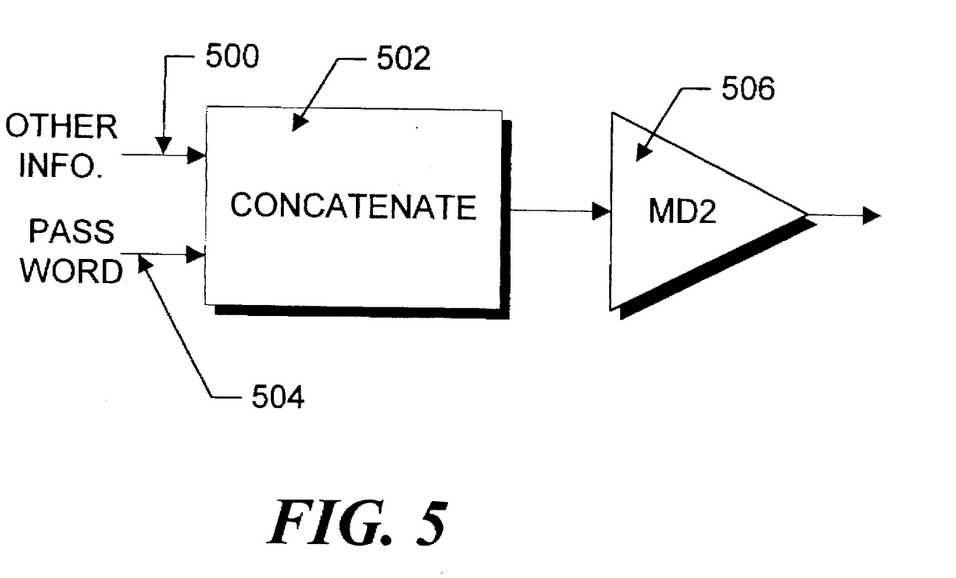
FIG. 5 is a schematic diagram illustrating apparatus for performing a cryptographic hash of input values.

An illustrative apparatus for generating a cryptographic "hash" of input values is illustrated in FIG. 5, but other, similar arrangements well-known to those in the art can also be used without departing from the scope of the invention. In particular, as shown in FIG. 5, the other values on input 500 and the ID code on input 504 are provided to a concatenator 502. Concatenator 502 simply concatenates the bits forming the other values with the bits comprising the ID code and provides the resulting series of bits to a one-way function 506.

A one-way function 506 is a well-known function which accepts a series of bits and performs a series of mathematical operations on the bits such that it is substantially impossible, given only the output of the one-way function, to reconstruct the input. There are several such functions well-known to those skilled in the art. One such function, suitable for use with the illustrative embodiment, is a one-way function called "MD2" which is described in detail in a book entitled *Network Security*, C. Kaufman, R. Perlman and M. Speciner, Prentice Hall 1995. A cryptographic hash is distinct from a key encryption scheme in that the encrypted data can be decrypted with the key. However, hashed data cannot be "unhashed."

Returning back to FIG. 4, the cryptographic hash is then parsed into a plurality of bit groups in step 408, each of which bit groups will be used to select the icons from the icon pool. Illustratively, the hashed ID code is parsed into a plurality of four-bit groups which are used to select one of sixteen icons in an icon pool.

Next, in step 410, the icons identified by the parsed bit groups are retrieved from the icon pool and, in step 412, the resulting icon pattern is displayed. The routine then finishes in step 414.

Figure 6A:
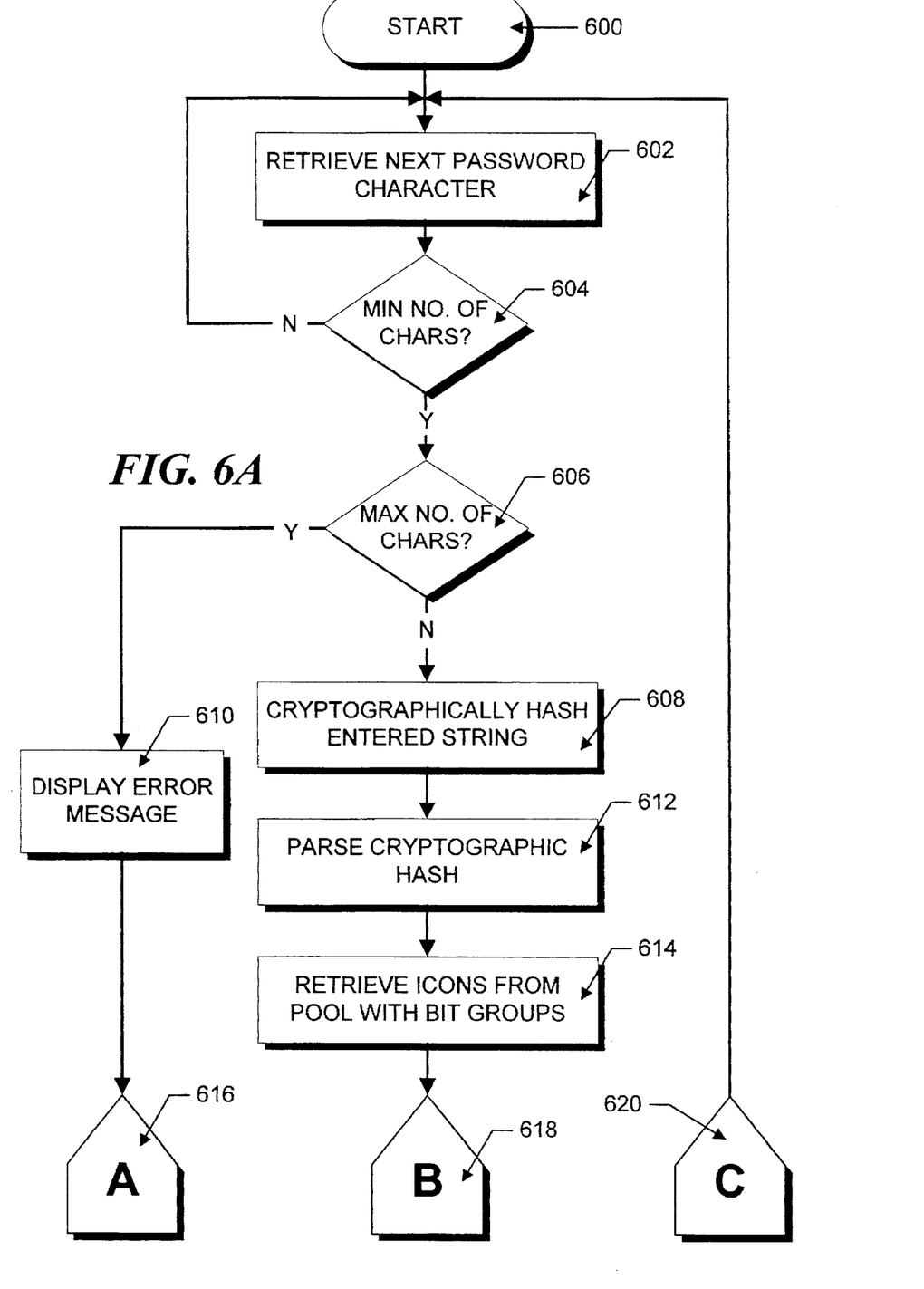
FIGS. 6A and 6B, when placed together, form an illustrative flowchart for a routine which changes the unique graphical display during a password entry sequence.
Figure 6B:
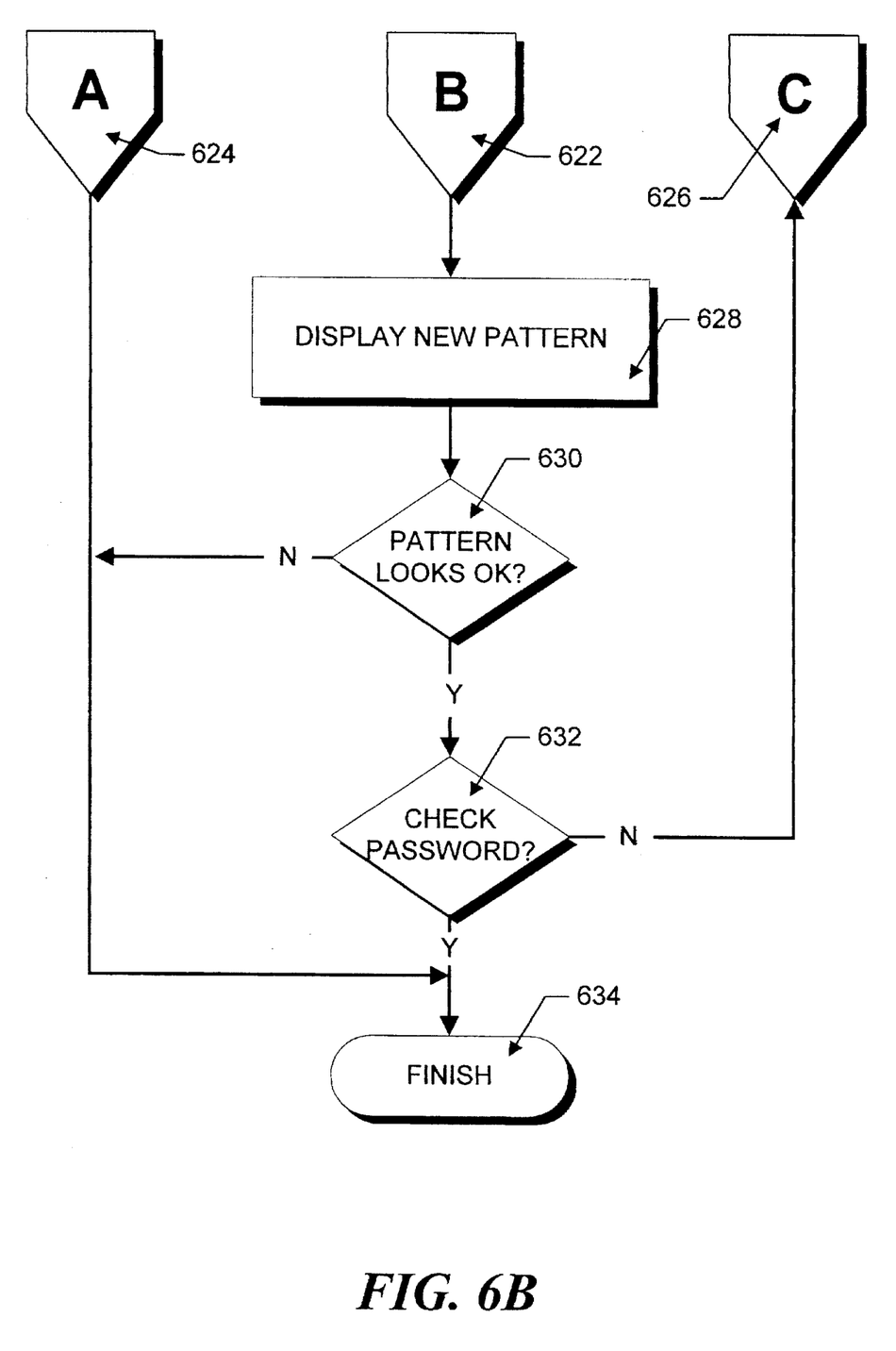

FIGS. 6A and 6B, when placed together, show an illustrative flowchart which comprises steps in a routine that changes the graphic display as a character string is entered based on the entered characters. The routine starts in step 600 and proceeds to step 602 where the next password character is retrieved from an input device, such as a keyboard. In step 604, a check is made to determine whether at least a predetermined minimum number of characters have been entered. As previously mentioned, a minimum number of characters must be entered before the display is changed in order to prevent observers from memorizing a particular graphic pattern and then using trial and error to determine the password character corresponding to the displayed pattern.

If the minimum number of characters have not been entered then the routine returns to step 602 to retrieve another character. Alternatively, if the minimum number of characters have been received in step 604, the routine proceeds to step 606 which checks whether a maximum number of characters has been received. If the maximum number of characters has been received and a valid password has not been detected, then an error is displayed in step 610 and the routine proceeds via off-page connectors 616 and 624 to terminate in step 634.

Alternatively, if, in step 606, less than the maximum number of characters have been entered, the routine proceeds to step 608 where the entered character string is hashed using a cryptographic technique. Illustratively, the character in the string entered up to that point may be concatenated with a secret number embedded into the password entry software code and the result may be further concatenated with another value such as a secret unique number known to the user, the user's name, the user's public key or an encrypted private key. The concatenation of the character string with these other values is done to increase the difficulty of deciphering the password character from the graphic display. Finally, the concatenated value is hashed by passing it through a one-way function as described above.

In step 612, the resulting cryptographic hash is parsed into bit groups in order to retrieve icons from the icon pool. In step 614, the icon bitmaps are retrieved from the pool based on the parsed bit groups in step 612. The routine then proceeds via off-page connectors 618 and 622 to step 628.

In step 628, the new icon pattern is displayed to the user. The user would observe this new pattern (as schematically indicated in step 630) and determine whether it is a correct pattern based on his memory of the patterns. If the pattern is not correct, the user knows at this point that the program into which he is entering password characters is an impostor program and would then abort the entry of information in step 634.

Alternatively, the routine proceeds to step 632 if the pattern looks correct to the user. In the illustrative embodiment, after the user has entered the correct number of characters for his password, he would indicate to the system in some manner (for example, by pressing a predetermined key) that the complete password has been entered and that the password should then be checked. If, in step 632, an indication that the password is complete and should be checked has been received, then the routine finishes in step 634 and another conventional routine (not shown) would check the entered character string for validity. Alternatively, if in step 632, it is determined that the entered characters are not a complete password, then the routine returns, via off-page connectors 626 and 620, to step 602 to await another character.

Although only one embodiment of the invention has been disclosed, it will be apparent to those skilled in the art that various changes and modifications can be made which will achieve some of the advantages of the invention without departing from the spirit and scope of the invention. For example, various well-known hashing techniques can be substituted for those disclosed above to achieve the same results. Similarly, the graphic pattern can be generated from the user's ID code directly without merely selecting icons from a pool of icons. These and other obvious modifications are intended to be covered by the appended claims.

What is claimed is:

1. Apparatus for establishing a protected channel between a user and a computer system in response to a user request, the computer system having a memory, a display device and an input device, the apparatus comprising:

means responsive to the user request for generating an entry screen display which requests information to be entered by the user on the input device;

means for storing information unique to the user in the memory in a manner in which the unique information cannot be obtained by persons other than the user; and means responsive to the information stored in the memory for generating an identifying graphic display which is distinct for the user along with the entry screen display.

2. Apparatus according to claim 1 further comprising:

means responsive to information entered on the input device by the user for modifying the identifying graphic display based on the entered information.

3. Apparatus according to claim 2 wherein the modifying means comprises means for delaying the modification of the graphic display until a predetermined minimum amount of information has been entered.

4. Apparatus according to claim 2 wherein the modifying means comprises means responsive to the information entered on the input device for generating a cryptographic hash of the entered information and means responsive to the cryptographic hash for modifying the identifying graphic display.

5. Apparatus according to claim 1 wherein the identifying graphic display generating means comprises:

a plurality of icon graphics;

means responsive to the information stored in the memory for selecting a subset of the plurality of icon graphics; and means for displaying the subset of the plurality of icon graphics in a predetermined pattern.

6. Apparatus according to claim 1 wherein the identifying graphic display generating means comprises means for generating a cryptographic hash based on the information stored in the memory and means responsive to the cryptographic hash for generating the identifying graphic display.

7. Apparatus for establishing a protected channel between a user and a computer system during the entry of a password by a user, the computer system having a memory, an application program running in the memory, a display device and an input device, the apparatus comprising:

means controlled by the application program for generating an entry screen display which requests password characters to be entered by the user on the input device;

means for storing an ID code unique to the user in the memory in a manner in which the ID code cannot be obtained by persons other than the user; and means responsive to the ID code for generating a graphic display pattern which is distinct for the user as part of the entry screen display.

8. Apparatus according to claim 7 further comprising:

means responsive to a string of characters entered on the input device by the user for modifying the identifying graphic display based on all of the entered characters.

9. Apparatus according to claim 8 wherein the modifying means modifies the display after each character is entered.

10. Apparatus according to claim 8 wherein the modifying means comprises means for delaying the modification of the graphic display until a predetermined minimum number of characters have been entered.

11. Apparatus according to claim 8 wherein the modifying means comprises means responsive to a string of characters entered on the input device for generating a cryptographic hash of the string of characters and means responsive to the cryptographic hash for modifying the identifying graphic display.

12. Apparatus according to claim 11 wherein the means for generating a cryptographic hash comprises means responsive to each entered character for generating the parity of the each entered character and means for generating a cryptographic hash of the parities of the entered characters.

13. Apparatus according to claim 11 wherein the identifying graphic display generating means comprises:

a plurality of icon graphics;

means responsive to the ID code for selecting a subset of the plurality of icon graphics; and means for displaying the subset of the plurality of icon graphics in a predetermined pattern.

14. Apparatus according to claim 13 wherein the identifying graphic display generating means further comprises means for generating a cryptographic hash based on the ID code and means responsive to the cryptographic hash for selecting a subset of the plurality of icon graphics.

15. A method for establishing a protected channel between a user and a computer system in response to a user request, the computer system having a memory, a display device and an input device, the method comprising the steps of:

A. generating an entry screen display which requests information to be entered by the user on the input device;

B. storing information unique to the user in the memory in a manner in which the unique information cannot be obtained by persons other than the user; and C. generating an identifying graphic display based on the unique information which identifying graphic display is distinct for the user along with the entry screen display.

16. A method according to claim 15 further comprising the steps of:

D. modifying the identifying graphic display based on information entered by the user on the input device.

17. A method according to claim 16 wherein step D comprises the steps of:

D1. delaying the modification of the graphic display until a predetermined minimum amount of information has been entered.

18. A method according to claim 16 wherein step D comprises the steps of:

D2. generating a cryptographic hash of the entered information in response to the information entered on the input device; and D3. modifying the identifying graphic display based on the cryptographic hash.

19. A method according to claim 15 wherein step C comprises the steps of:

C1. storing a plurality of icon graphics in the memory;

C2. selecting a subset of the plurality of icon graphics based on the information stored in the memory; and C3. displaying the subset of the plurality of icon graphics in a predetermined pattern.

20. A method according to claim 15 wherein step C further comprises the steps of:

C4. generating a cryptographic hash based on the information stored in the memory; and C5. generating the identifying graphic display based on the cryptographic hash.

21. A computer program product for establishing a protected channel between a user and a computer system in response to a user request, the computer system having a memory, a display device and an input device, the computer program product comprising:

a computer useable medium comprising:

means responsive to the user request for generating an entry screen display which requests information to be entered by the user on the input device;

means for storing information unique to the user in the memory in a manner in which the unique information cannot be obtained by persons other than the user; and means responsive to the information stored in the memory for generating an identifying graphic display which is distinct for the user along with the entry screen display.

* * * * *